2 Sheets—Sheet 1.
H. W. PEASLEE.
Pulp Washer.
No. 2,515.
Reissued March 19, 1867.
Fig. 3,
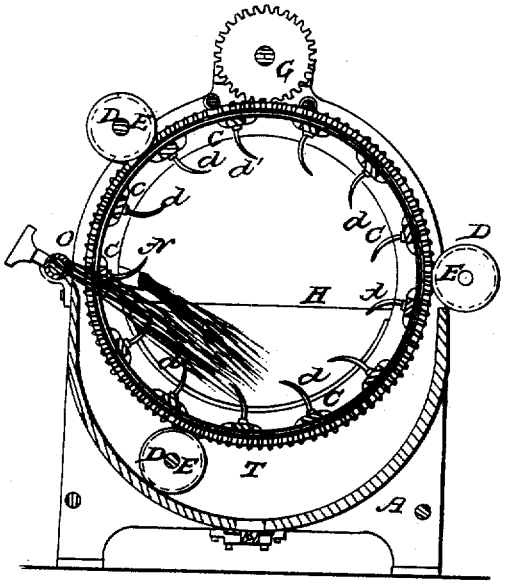
Fig. 1,
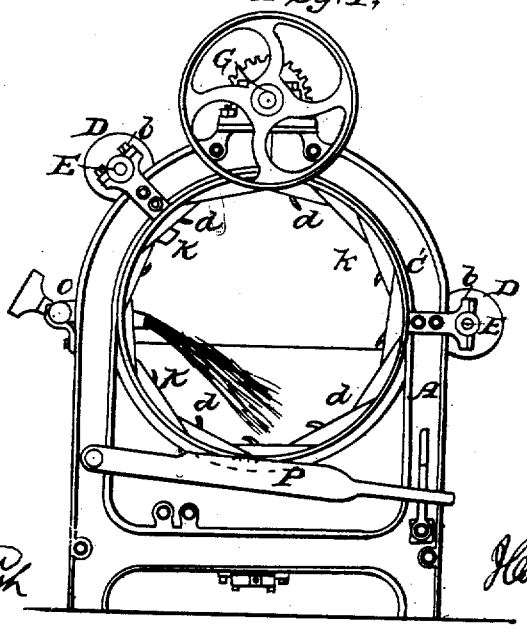
WITNESSES
W. M. Middleton
Alford Bush
INVENTOR
Horace W. Peaslee.
N. PETERS, Photo-Lithographer, Washington, D. C.

68. TEXTILES, FLUID TREATING APPARATUS.
58
2 Sheets—Sheet 2.
H. W. PEASLEE.
Pulp Washer.
No. 2,515.
Reissued March 19, 1867.
Fig. 2,
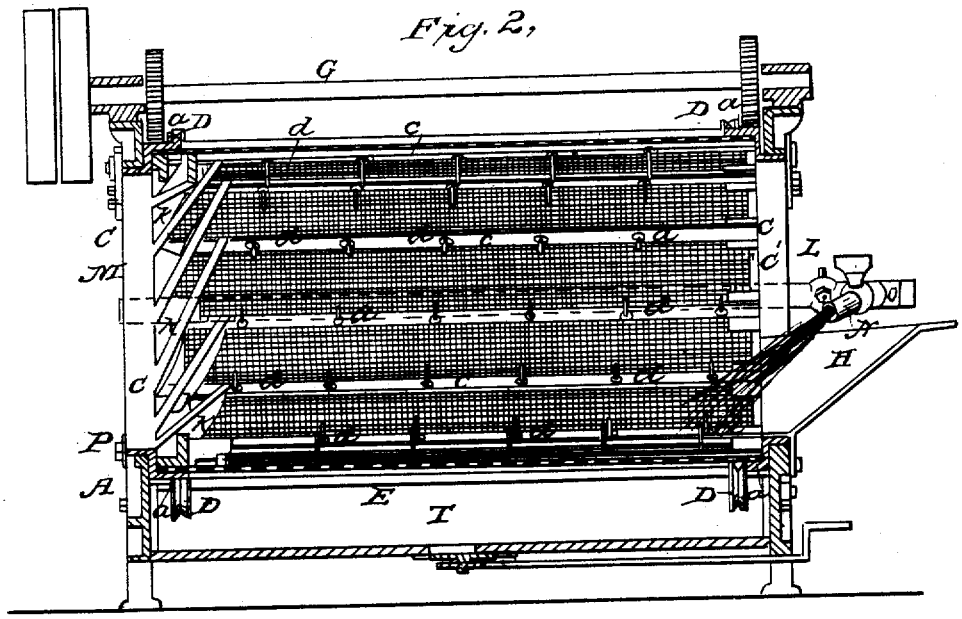
Fig. 4,
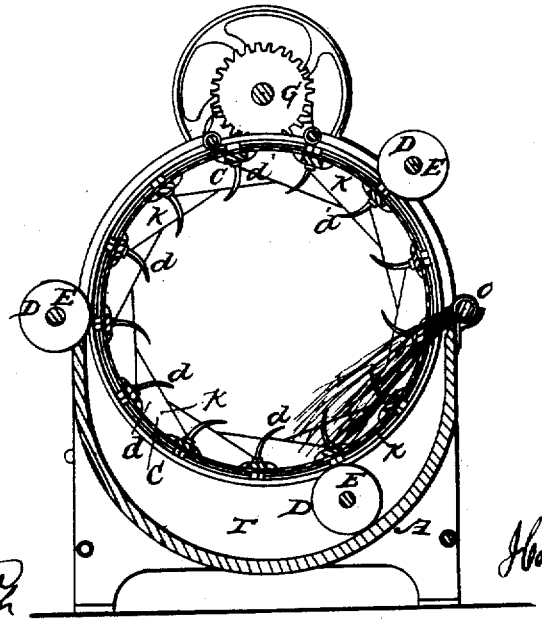
WITNESSES
H. W. Mulleman
Alfred Auch
INVENTOR
Horace W. Peaslee
N. PETERS. Photo-Lithographer, Washington, D. C.

8. TEXTILES, FLUID
TREATING APPARATUS.

Search Room

58

BEST AVAILABLE COPY

UNITED STATES PATENT OFFICE.

HORACE W. PEASLEE, OF MALDEN BRIDGE, NEW YORK.

IMPROVEMENT IN MACHINES FOR WASHING PAPER-STOCK.

Specification forming part of Letters Patent No. 12,283, dated January 23, 1855; antedated September 20, 1854; Reissue No. 340, dated January 8, 1856; Reissue No. 2,515, dated March 19, 1867.

*To all whom it may concern:*

Be it known that I, HORACE W. PEASLEE, of Malden Bridge, in the county of Columbia and State of New York, have invented certain new and useful Improvements in Machinery for Washing Paper-Stock; and I do hereby declare that the following is a full, clear, and exact description of the same, reference being had to the accompanying drawings, making part of this specification, in which—

Figure 1 is a view of that end of the machine where the discharge of the washed stock takes place. Fig. 2 is a longitudinal vertical section through the center. Fig. 3 is a transverse vertical section looking toward the entrance to the cylinder. Fig. 4 is a transverse section looking toward the discharge end of the cylinder.

Similar letters of reference indicate corresponding parts in the several figures.

My said invention relates to machinery for washing paperstock; and it consists of a rotating horizontal or nearly horizontal pervious cylinder, through which water can pass freely for the washing operation within, formed with open and unobstructed ends, that during the operation the stock to be washed may be introduced at one end and as washed discharged at the other without obstruction, and provided with projecting teeth inside to catch and lift up and drop the stock as the cylinder rotates; and my said invention also consists in combining with such a pervious cylinder means for supplying water from the outside through the meshes of the said cylinder.

To enable others skilled in the art to make and use my invention, I will proceed to describe its construction and operation.

A A is the framing of the machine, with a trough, T, in which rotates the lower part of the washing-cylinder, a small portion of the lower part only of which is intended to be immersed in water. The cylinder is made of woven wire-work attached to two strong metal rings, C C, one at each end, which are finished outside with V-shaped ways *a a*, fitted to grooves in rollers D D on shafts E E, having journals fitted to boxes *b b* on the standards A A. The rollers D D form bearings on which the cylinder rotates. A portion, *c'*, of each ring C passes through a circular opening in one of the standards A A, in which it fits so as not to produce too much friction, the object being to bring the open ends of the cylinder flush with and beyond the outer faces of the standards and to close up the ends of the trough, which consist in part of the standards, so that very little, if any, water will escape around the cylinder, and to prevent the paper-stock from entering between the end of the cylinder and the trough, the sole purpose of the trough being to economize water. Each ring C is furnished with spur-teeth all around, to gear with one of two spur-wheels on the driving-shaft G, sustained in boxes on the standard and above the cylinder, and receiving rotary motion from any suitable motor for the purpose of revolving the cylinder. The cylinder is strengthened by longitudinal wooden strips *c c*, which are close to the inner surface of the wire-work, and which serve to hold the hooks or teeth *d d*. These teeth are made of steel, with sharp points, and are best curved the direction of the rotation to catch and carry up the rags or other stock as the cylinder rotates and drop it as they severally rise to their highest position, as shown at *d' d'* in Figs. 3 and 4. They may be arranged in a spiral line winding several times round the cylinder, as shown in Fig. 2, the direction of the spiral being such as will cause the stock to be carried from the end L of the cylinder, where it is fed in, to the other end, M, where it is discharged. At the end L of the cylinder where the stock is to be fed in there is a chute, H, secured to the standard A, and extending a short distance into the cylinder as shown in Fig. 2. At the opposite or discharge end of the cylinder are arranged any desired number of oblique curb-pieces, K K, placed at equal distances apart, firmly bolted to the cylinder, extending from the inner edge of the part *c'* of the ring C a short distance into the cylinder, and of such depth as to form a barrier to regulate the delivery of the paper-stock from the cylinder. The spaces between the curb-pieces form channels, and the obliquity of these channels is such that when the washed stock arrives at that end of the cylinder it enters the channels on the ascending side of the cylinder, and is thus discharged. The cylinder is kept constantly supplied with water, which is thrown on the stock both as it enters the chute H and also while it is being carried along the cylinder from a pipe, *o*, which pipe is furnished with a nozzle, N, so directed as to throw a stream directly on the stock as it is entering the cylinder. This pipe extends all along the outside of the cylinder on the ascending side, and is perforated to throw a number of smaller streams of water through the whole length of the wire work of the cylinder to meet the stock as it is being carried up by the revolution of the cylinder. The pipe *o* should be so supplied as to throw the water upon the stock with great force to wash out the dirt. While the machine is in operation the supply of water from the nozzle N and perforated jet-pipe *o* is so controlled by cocks, and the escape from the trough so regulated by a sliding gate, P, at the delivery end, that the cylinder is kept flooded only to about the level of the top edge of the lowest curb-piece, K. The stock is fed in continuously by hand down the chute H in such quantities as to keep the cylinder about one-third full, or in greater or less quantity, as may be found desirable, and as soon as it enters it is caught by the teeth and carried up to meet the jets of water which enter through the cylinder from the pipe *o*, after which, by its continued ascent, it is drained until it reaches the top of the cylinder, where it drops from the teeth to be again caught up and submitted again to similar operations, which continue to be repeated until the stock is carried to the end M of the cylinder and discharged therefrom. The washing operation may be repeated as often as necessary, either in the same machine or other machines of the same construction. The cylinder may be rotated at the rate of about fifteen to twenty revolutions per minute, but this may be varied, if desired. Instead of arranging the teeth spirally around the cylinder they may be arranged in rings, but in that case the cylinder will require to be placed at a slight inclination in order that the stock may be carried toward the delivery end. The principal object of the spiral arrangement of the teeth is to avoid placing the cylinder in an inclined position, as when thus placed the water cannot be at the same depth at both ends, but should be deepest at the discharge end, where the curbs would require to be too high for proper and efficient escape or the discharge of the stock. The oblique curbs K, it will be observed, are arranged in close succession around the discharge end of the cylinder, and form, as before stated, passages between them for the discharge of the stock. Were it not for the channel-ways, the stock would accumulate in too great quantities at the discharge end of the cylinder before being discharged, for whatever might be used to retain the required quantity of water would retain the stock.

What I claim as my invention in machinery for washing paper-stock, and desire to secure by Letters Patent, is—

A rotating pervious cylinder provided with projecting teeth on the inside, and mounted, substantially as herein described, so as to be sustained and rotated without a shaft and arms, that the inside and ends may be unobstructed for the passage of the stock, substantially as and for the purpose described.

2. In combination with a pervious rotating cylinder, armed with teeth on the inside, substantially as described, the means, substantially as described for the introduction of water through the meshes of the cylinder to the stock inside, as and for the purpose described.

HORACE W. PEASLEE.

Witnesses:
RANSEN GARDENIER,
JAMES G. FARRISH.